(12) United States Patent
Agarwall et al.

(10) Patent No.: US 8,111,649 B1
(45) Date of Patent: Feb. 7, 2012

(54) METHOD AND APPARATUS FOR ENABLING A HOST TO INFLUENCE HOW A PACKET IS ROUTED THROUGH A NETWORK

(75) Inventors: Amit Agarwall, Mountain View, CA (US); Ross Koningstein, Menlo Park, CA (US); Hsiao-Keng J. Chu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 12/059,186

(22) Filed: Mar. 31, 2008

(51) Int. Cl.
*H04W 4/00* (2009.01)
(52) U.S. Cl. .................................................. 370/328
(58) Field of Classification Search .................. 370/389, 370/473, 401, 233, 471, 238, 469, 328, 250, 370/235
See application file for complete search history.

(56) References Cited

U.S. PATENT DOCUMENTS

| 7,151,775 | B1 * | 12/2006 | Renwick et al. | 370/400 |
| 7,342,886 | B1 * | 3/2008 | Srinivasan et al. | 370/235 |
| 2007/0047514 | A1 * | 3/2007 | Rayment et al. | 370/351 |
| 2007/0076615 | A1 * | 4/2007 | Lea et al. | 370/238 |

* cited by examiner

*Primary Examiner* — Dang Ton
*Assistant Examiner* — Nourali Mansoury
(74) *Attorney, Agent, or Firm* — Foley & Lardner LLP

(57) ABSTRACT

One embodiment of the present invention provides a system for routing packets in a network. A router may receive a packet at an input port which originated from a source system and which is destined to a destination system. The packet may include a traffic-management field which enables the source system to influence how the packet is routed through the network without requiring the source system to explicitly specify nodes that the packet should traverse. The router can use the traffic-management field to select an output port from a set of output ports of the router that are associated with different paths to the destination system. Since the traffic-management field's value is set by the source system, it enables the source system to influence how the router selects the output port, thereby enabling the source system to influence how the packet is routed through the network.

25 Claims, 4 Drawing Sheets

PACKET 200

| VER. 202 | LEN. 204 | TYPE OF SERVICE 206 | TOTAL LENGTH 208 | |
|---|---|---|---|---|
| IDENTIFICATION 210 | | | FLAGS 212 | FRAGMENT OFFSET 214 |
| TIME TO LIVE 216 | PROTOCOL 218 | | HEADER CHECKSUM 220 | |
| SOURCE ADDRESS 222 | | | | |
| DESTINATION ADDRESS 224 | | | | |
| OPTIONS 226 | | | | PADDING 228 |
| SOURCE PORT NUMBER 230 | | | DESTINATION PORT NUMBER 232 | |

METHOD AND APPARATUS FOR ENABLING A HOST TO INFLUENCE HOW A PACKET IS ROUTED THROUGH A NETWORK

FIELD OF THE INVENTION

The present invention relates to communication networks. More specifically, the present invention relates to methods and apparatuses for enabling a host to influence how a packet is routed through a network.

BACKGROUND

Related Art

The Internet has permeated almost all aspects of our lives—from buying books to buying real estate, and from reading a newspaper to watching a movie. Even as new advances in computer networking technologies continue to transform our lives, there still remain a number of nagging networking problems which have not been solved adequately.

Quickly detecting and rerouting traffic around network failures and congested links is one such problem. Conventional restoration techniques take too long to detect and reroute traffic around network failures. Networks typically combat congestion by throttling down traffic which is also not desirable.

Another problem with conventional networks is that they don't fully exploit the network's available bandwidth. When a route or a link is congested, there are usually other routes or links in the network that have spare capacity, but conventional routing techniques typically cannot use this spare bandwidth to ameliorate congestion. Similarly, even though the network may have many underutilized links, an application that requires high throughput usually cannot exploit this unused capacity for increasing its throughput. Hence, what are needed are techniques and systems that can help solve these problems in communication networks.

SUMMARY

One embodiment of the present invention provides a system for routing packets in a network. During operation, a router may receive a packet at an input port which originated from a source system and is destined to a destination system. The packet may include a traffic-management field which enables the source system to influence how the packet is routed through the network without requiring the source system to explicitly specify nodes that the packet should traverse. For example, the packet can be an IPv4 (Internet Protocol Version 4) packet or IPv6 (Internet Protocol Version 6) packet, and the traffic-management field can use one or more bits in the type-of-service field in the packet's header. Next, the router may determine a set of output ports of the router that are associated with different paths to the destination system. In one embodiment, the different paths may be equal-cost paths. The router may then select an output port in the set of output ports using the traffic-management field. Next, the system may send the packet through the output port. Since one or more routers in the network use the traffic-management field to select the output port, it enables the source system to influence how the packet is routed through the network.

In a variation on this embodiment, the router determines a set of outputs by performing a route-lookup using information contained in the packet's header. The router can select an output port by evaluating an expression using the traffic-management field. In one embodiment, the expression can be ((f(src_ip, dst_ip, L4_prot, L4_src_port, L4_dst_port)+TrafficMgmt) mod NumberOfNextHops), where f is a hash function, src_ip is the packet's source address, dst_ip is the packet's destination address, L4_prot is a value of a protocol field in the packet's header which is associated with a transport layer protocol, L4_src_port is the packet's source port number, L4_dst_port is the packet's destination port number, TrafficMgmt is the traffic-management field, NumberOfNextHops is the number of output ports in the set of output ports, and "mod" is the modulo operation.

In a variation on this embodiment, the traffic-management field is used to: reroute traffic around a congested link, reroute traffic around a failed link, reroute traffic around a failed node, or increase throughput by concurrently sending traffic over multiple routes.

Another embodiment of the present invention provides methods and apparatuses for enabling a host to influence how a packet is routed through a network without explicitly specifying which nodes the packet should traverse. During operation, an application may provide a packet to a source system which is to be sent to a destination system. The packet may be part of a packet flow, and the packet may include a traffic-management field. The packet may be expected to be routed through a router in the network which is expected to use the traffic-management field to select an output port of the router from a set of output ports of the router that are associated with different paths between the router and the destination system. The source system may set the traffic-management field to a desired value, which enables the source system to influence how the router selects the output port, and hence, enables the source system to influence how the packet is routed through the network. Next, the source system may send the packet to the destination system, which can cause one or more routers in the network to select output ports based on the traffic-management field.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Network

Figures 1, 2:
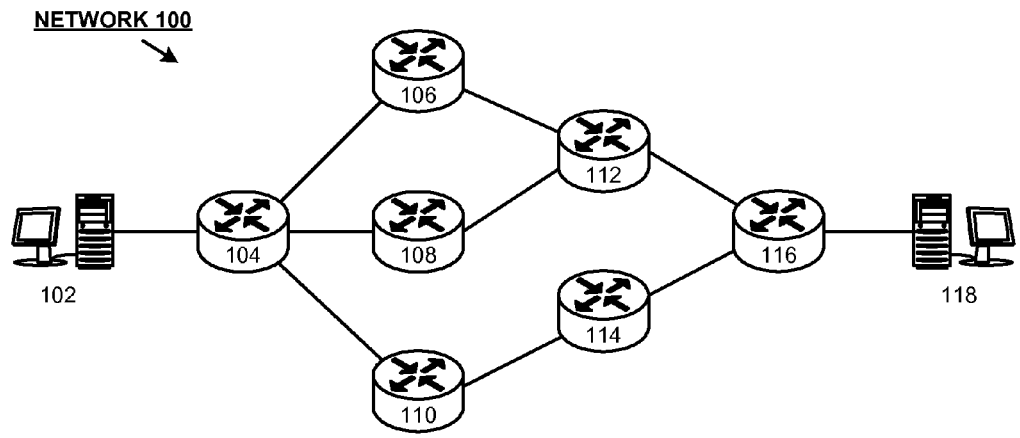
FIG. 1 illustrates a network in accordance with an embodiment of the present invention.
FIG. 2 illustrates a packet in accordance with an embodiment of the present invention.

FIG. 1 illustrates a network in accordance with an embodiment of the present invention.

A network can generally include network nodes that are coupled together using wired or wireless communication channels. This includes, but is not limited to, a local area network, a wide area network, or a combination of networks. In one embodiment, a network can include the Internet.

For example, network 100 comprises hosts 102 and 118, and routers 104, 106, 108, 110, 112, 114, and 116. The routers in the network can be coupled using wired or wireless communication channels to form an arbitrary mesh topology. Embodiments of the present invention are not limited to the topology, technology, or architecture of network 100.

A network node (or "node" for short) can generally include any type of system capable of communicating with other systems via a network. This includes, but is not limited to, a computer system based on a microprocessor, a mainframe computer, a printer, a router, a personal organizer, or a mobile phone. For example, hosts and routers shown in FIG. 1 can be network nodes. Note that we use the terms "router" and "switch" interchangeably.

Packet

In packet switched networks, nodes use packets to communicate with one another. A packet usually includes a header section which typically contains source and destination address information, and a payload section which usually contains the data that is being communicated. The packet may also include a trailer section which typically contains an error checking code.

Communication can be accomplished using a layered software architecture, which is often referred to as a networking stack. A layer in the networking stack is usually associated with a set of protocols which define the rules and conventions for processing packets in that layer.

Each layer performs a service for the layer immediately above it to help with processing packets, and each layer typically has its own header which it uses to communicate with its peer on the other node. At the sender, each layer adds its header as the payload moves from higher layers to lower layers. The receiver generally performs the reverse of this process by stripping headers at each layer as the packet moves from the lowest layer to the highest layer.

FIG. 2 illustrates a packet in accordance with an embodiment of the present invention.

Packet 200 is an Internet Protocol version 4 (IPv4) packet whose header includes a number of fields, such as, version 202, header length 204, type of service 206, total length 208, identification 210, flags 212, fragment offset 214, time to live 216, protocol 218, header checksum 220, source address 222, and destination address 224. The header can additionally include options field 226 and padding 228.

A header for another layer, e.g., UDP (User Datagram Protocol), may follow the IPv4 header. For example, the UDP header may include source port number 230 and destination port number 232. After the various headers, the packet may contain the payload. The packet shown in FIG. 2 is for illustration purposes only, and is not intended to limit the present invention. For example, embodiments of the present invention can be used in IPv6 networks. In general, embodiments of the present invention can be used in any packet switched network.

Router

As a packet traverses the network from the source system to the destination system, it may pass through one or more routers, which are typically coupled to form an arbitrary mesh topology. Each router typically uses information in a packet's header to determine how to forward the packet.

Figure 3:
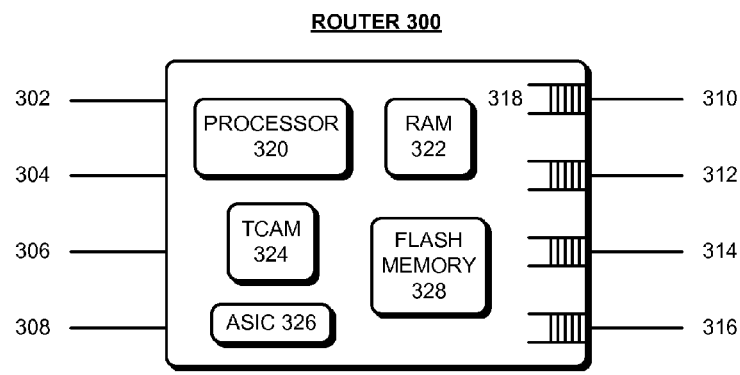
FIG. 3 illustrates a router in accordance with an embodiment of the present invention.

FIG. 3 illustrates a router in accordance with an embodiment of the present invention.

Router 300 may receive packets via its input ports, e.g., ports 302, 304, 306, and 308, and send them via its output ports, e.g., ports 310, 312, 314, and 316. A router usually includes hardware and/or software to determine how to forward packets. For example, router 300 can include queue 318, processor 320, RAM (Random Access Memory) 322, TCAM (Ternary Content Addressable Memory) 324, ASIC (Application Specific Integrated Circuit) 326, and flash memory 328. These components can be coupled using a bus or a switch.

Flash memory 328 may store the router's configuration and software, which may be loaded into RAM 322 during boot-up. Processor 320 may be used to execute routing protocol software and network management software. ASIC 326 may be used to process information in a packet's header, and TCAM 324 may be used to perform routing-table lookups. The router may use queues, e.g., queue 318, to store packets while they are waiting to be processed, or while they are waiting to be sent via an output port. FIG. 3 has been presented only for purposes of illustration, and is not intended to limit the present invention. Many modifications and variations will be apparent to practitioners skilled in the art. For example, a router may include multiple line cards which may be coupled via a backplane, and each line card may have its own hardware and software. A router may also include a network processor which executes instructions for processing packets.

Multipath Routing, Failure Recovery, and Congestion

A network may have multiple paths from a source node to a destination node. A router may decide to forward packets via only one of these paths, or it may decide to use multiple paths to forward packets to a destination.

Figure 4:
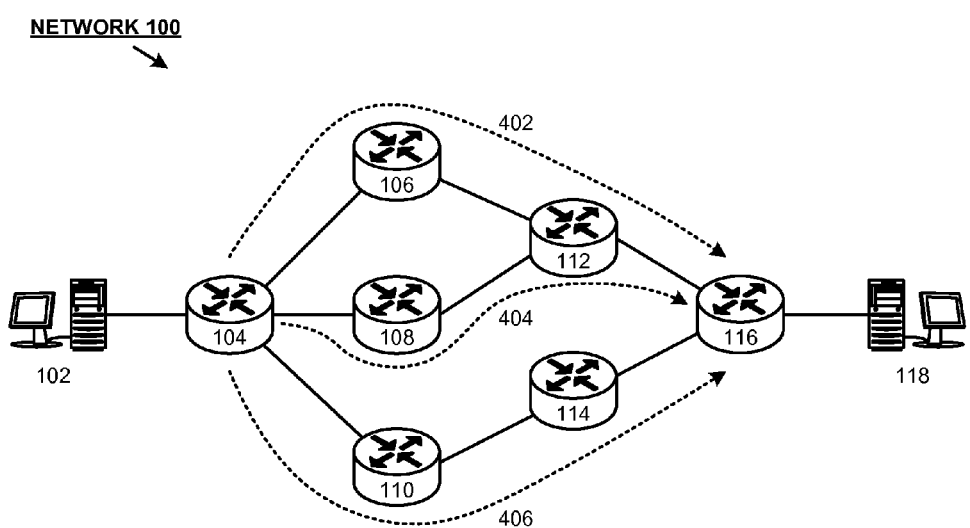
FIG. 4 illustrates multipath routing in accordance with an embodiment of the present invention.

FIG. 4 illustrates multipath routing in accordance with an embodiment of the present invention.

Two paths are different from one another if they differ in least one router or link. Packets from host 102 can be routed to host 118 via at least three different paths, namely, paths 402, 404, and 406. Path 402 passes through routers 104, 106, 112, and 116, path 404 passes through routers 104, 108, 112, and 116, and path 406 passes through routers 104, 110, 114, and 116. The multiple paths can be provisioned for a variety of reasons such as handling increased traffic loads, reducing hotspots, fault tolerance to various network element failures such as link failures and router failures.

Today's networks have link speeds of tens of gigabits per second and these speeds are expected to increase rapidly as high bandwidth video and audio applications become more popular. At such high link speeds, the amount of data that is lost per second due to a failure can be enormous. Further, networks are increasingly being used for mission critical business applications which makes it even more important to reduce the time it takes for a network to recover from failures.

Routers typically execute routing protocols which enable the network to reroute traffic when a link or node fails. The routing protocol exchanges routing information with other routers and then computes routes to all destinations. For every destination network, which may be identified using an IP address and an IP address mask, the routing table provides a set of next hops. These forwarding entries are then populated in the Forwarding Information Base (FIB) which associates each next hop with its link layer adjacency. For example, the network shown in FIG. 4 may route packets over path 402 during normal operation. If the link between router 106 and 112 fails, the network may reroute traffic via path 404. On the other hand, if router 112 fails, the network may reroute traffic via path 406.

In conventional techniques, hosts typically do not execute routing protocols and they are usually not aware of the network topology or the status of network elements. Even if a host was aware of the network topology and the status of network elements, the host would have to wait for the network to reroute traffic, because, in conventional systems, hosts usually cannot control or influence how a packet is routed through the network.

Some techniques, e.g., source routing, allow a host to explicitly specify one or more nodes in the route. However, these techniques turn out to be heavyweight in terms of computational and operational complexity on the host as well as the network. Hence, it is not surprising that routers usually don't have hardware support for such source routing techniques. Additionally, these techniques are not scalable since the number of nodes that the source system has to explicitly specify depends on the size of the network. Furthermore, adding support for such source routing techniques usually requires substantial changes to the router's hardware.

Conventional packet switched network technologies can take an unacceptably long time to detect a network failure and to reroute traffic around the failure. Specifically, conventional packet switched networks can easily take a few seconds for a routing protocol to detect and reroute traffic around a network failure. At link speeds of tens of gigabits per second, such long recovery times can be unacceptable.

Some techniques, e.g., fast re-route, trunks, etc., claim restoration times that are in the tens of milliseconds. However, these techniques are usually too complex or expensive to deploy, and some of them require specific network topologies or configurations. Other techniques use packet probes to measure latency and detect failures. However, these techniques also have drawbacks, because, they need to run on the hosts themselves, they put excessive load on the network, and they require the network elements to perform substantially more processing than they would otherwise have to perform.

In contrast to these conventional approaches, one embodiment of the present invention enables a host to quickly reroute traffic around a link or node failure in the network without the above-described drawbacks.

Network congestion can occur for a variety of reasons such as over-subscription, bursty traffic, etc. Congestion can increase delays, cause packet loss, and block new connections. Convention network technologies usually combat congestion by throttling the amount of traffic. Specifically, RED (Random Early Detection) and WRED (Weighted Random Early Detection) do it by explicitly dropping packets whereas ECN (Explicit Congestion Notification) does it by marking a bit in the IP header which can cause the host to reduce the amount of traffic it is sending. Although these techniques can be effective, they usually reduce the amount of traffic that nodes send each other which is a serious drawback. Other approaches perform traffic-management by moving traffic flows dynamically depending upon load. However, these approaches can be very complex to implement and can require substantial changes to a router's hardware and software.

In contrast to conventional approaches, one embodiment of the present invention enables a host to quickly reroute traffic around a congested link or node without throttling down the traffic and without requiring large number of hardware or software changes to the router.

Routers that have multipath routing capability typically use a hash function to select an output port from a set of output ports that are associated with equal-cost paths to the destination. Per-flow multipath routing fails to solve congestion problems that occur when multiple flows are mapped to the same output port. The input to the hash function may be different for each of these flows because they may have different port numbers, etc., but the hash function may map all of these flows to the same output port, thereby causing congestion.

In contrast to conventional per-flow multipath routing approaches, embodiments of the present invention can avoid such congestion problems because the source system can control or influence how the packet is routed through the network. As a result, the affected application or host system can detect the congestion and reroute the flow to a different output port, thereby causing different flows to be mapped to different output ports.

One technique for increasing overall network utilization is to use traffic dispersion which increases utilization by spreading traffic over multiple paths. Studies have shown that traffic dispersion improves network performance and increases tolerance to faults.

Per-packet multipath routing can be used to perform traffic dispersion. However, per-packet multipath routing can cause packet reordering, and hence, it may not be suitable for applications and protocols such as TCP (Transmission Control Protocol) which are sensitive to out-of-order packets. The per-flow approach does not reorder packets, but it can result in congestion if the network maps multiple high bandwidth flows to the same path. Hence, both the per-flow approach and the per-packet approach have disadvantages.

Conventional approaches do not enable a host to select the type of multipath routing on a per-application basis because the type of multipath routing is selected on a per-router basis, i.e., the same type of multipath routing is applied to all traffic passing through a router. Further, it can be impractical to ask a router to select multipath routing based on each packet's prefix or destination address because that would require each router to know the current preferences for all of the prefixes or destinations in the network.

In contrast to conventional techniques, an embodiment of the present invention enables a host to select the type of multipath routing that is used for routing packets on a per-application basis. This approach scales well because it does not require routers to store multipath routing preferences for each application in the network.

Host Assisted Traffic Management

Routers with multipath routing capability typically perform a route lookup using the destination address to determine a set of output ports that can be used to forward the packet to the next hop. The router can then select an output port from the set of output ports using a number of techniques. For example, the router can select the output port in a round-robin fashion, or it can select the output port with the least traffic load.

Alternatively, the router can select the output port by computing a hash of some of the header fields. For example, a router may compute a hash value using the source address, the destination address, the protocol identifier, and the source and destination port numbers. Next, the router can use the hash value to select an output port from the set of output ports that correspond to the different paths to the destination.

An embodiment of the present invention enables a host to use a traffic-management field to influence how a router selects an output port to forward the packet. The traffic-management field can generally include any set of bits in the packet. The set of bits can be contiguous or they can be non-contiguous. In one embodiment, the traffic-management field can use the bits in an IPv4 packet's type of service 206 field shown in FIG. 2.

The router can compute the hash value as before. However, instead of using the hash value directly to select an output port, the router can modify the hash value using the traffic-management field. For example, the system may add the traffic-management field's value to the hash value using modulo arithmetic. Note that this approach can be implemented using very little additional hardware since it essentially requires additional circuitry that can perform an addition and a modulo operation. In one embodiment, ASIC 326 can be used to compute the hash value and to perform the modulo addition.

More specifically, the router can evaluate the expression ((f(src_ip, dst_ip, L4_prot, L4_src_port, L4_dst_port)+TrafficMgmt) mod NumberOfNextHops), where f is a hash function, src_ip is the first packet's source address, dst_ip is the first packet's destination address, L4_prot is a value of a protocol field in the first packet's header which is associated with a transport layer protocol, L4_src_port is the first packet's source port number, L4_dst_port is the first packet's destination port number, TrafficMgmt is the first traffic-management field, NumberOfNextHops is the number of output ports in the set of output ports, and "mod" is the modulo operation. Next, the router can use the value of this expression to select an output port. For example, the router may associate each output port in the set of output ports with a number in the range [0, NumberOfNextHops−1], and select the output port that is associated with the value of the expression.

If the traffic-management field has n bits, it can be used to select up to $2^n$ possible routes. For example, if the router was using next hop "i" when the traffic-management field was set to the value k, the host can set the traffic-management field's value to value k+1 to cause the router to use next hop "((i+1) mod NumberOfNexthops)." In this manner, the host can iterate over different paths by changing the value of the traffic-management field. Since this approach imposes minimal processing requirements on the host and the routers, the host can easily send each packet with a different traffic management value without worrying about the impact it will have on the network.

A number of variations are possible. For example, in one variation, instead of adding the traffic-management field to the output of the hash function, the router can provide the traffic-management field as an input to the hash function itself. One potential drawback of this approach is that consecutive values of the traffic-management field may cause the hash function to return the same value, which may cause the router to select the same route through the network.

Other possibilities for the traffic-management field include using a VLAN (Virtual Local Area Network) tag, a type of service field, a quality of service field, and an MPLS (Multi-Protocol Label Switching) label. If the network supports VLANs, the router can use the VLAN tag to select the output port. Hence, the host can influence how a packet is routed by using a different VLAN tags. Note that the VLAN tag is typically removed by the edge device, and hence, this approach may not enable a host to influence how a packet is routed through the core network.

As mentioned earlier, the IP header includes an 8 bit field for indicating the quality of service or type of service. The traffic-management field can use some or all of these bits. The number of bits used will determine the maximum number of different paths that a host can select. DSCP (Differentiated Service Code Point) is one technique for providing quality of service which uses 6 bits out of the 8 bits in the type of service field. In one embodiment, the traffic-management field can use the last three bits of the DSCP field.

Using the VLAN tags or the DSCP field as the traffic-management field can be beneficial because routers can usually be configured to change their forwarding behavior based on these fields. Specifically, access control lists (ACLs) can be programmed in a router so that the router forwards traffic in a manner that achieves the desired effect. For example, we can program ACLs such that if the VLAN tag is "1," the router will select output port x, if the VLAN tag is "2," the router will select output port (x+1), etc. This ACL based approach can be implemented in conventional routers because it may not require any changes to the hardware or the software. However, this approach may not be scalable because it can require a large number of access control entries if the number of routes is large. Further, the ACL definitions have to be consistent throughout the network. Hence, if we want to change how the traffic-management field is interpreted, we may need to load a new set of ACLs in all the routers in the network.

Note that the traffic-management field doesn't cause packet reordering in per-flow multipath routing. Since the hash value is usually the same for each packet belonging to the same flow, packet reordering will not occur as long as the router uses the traffic-management field to change the hash value in a deterministic fashion.

Further, note that the host-based traffic management approach is backward compatible. If a network operator decides to use the type of service bits for specifying the type of service instead of using them for the traffic-management field, it won't cause the router to behave incorrectly. The router may select a different output port than it would have selected in absence of the minor hardware modifications required for implementing host-based traffic management. However, the router will behave correctly because it will still select a valid path for routing the packet.

Rerouting Traffic Around Network Failures and Dispersion Routing

As mentioned above, a network can take an unacceptably large amount of time (e.g., a few seconds) to detect and reroute around a network failure. However, transport layer protocols such as TCP can detect packet loss within a short period of time (a few tens or hundreds of milliseconds).

The time it takes for a host to realize that a packet has been lost and thereby detect a potential network failure can depend on the round trip time for the packet. In a WAN (Wide Area Network), the propagation delay can be a substantial portion of the round trip time, and hence, a source may take hundreds of milliseconds to detect a failure. However, in a LAN (Local Area Network), the propagation delay is much smaller, which can enable a host to detect failures in much less time, e.g., tens of milliseconds. Specifically, in the case of TCP, the retransmission timeout fires if a packet is lost. The retransmission timeout can be set to a few hundreds of milliseconds for a WAN and as low as a few tens of milliseconds for a LAN.

Unfortunately, conventional techniques do not enable hosts to influence how packets are routed over the network. Hence, even though the host may detect a failure sooner than the network, in conventional networks, the host has to wait for the network to reroute the traffic around the failure.

However, one embodiment of the present invention enables a host to use the traffic-management field to reroute traffic around the network failure as soon as the host detects a network failure. The host's networking stack may require minor modifications so that the networking stack changes the traffic-management field when it detects a packet loss, e.g., when a timer expires. Specifically, in TCP, the host can retransmit the packet with a different traffic-management field when the TCP RTO (Retransmission Time Out) timer expires.

Note that if the network has a tree topology each pair of nodes has exactly one path between them. In such situations, the embodiment may have to wait for the network to heal itself. However, many networks have a mesh topology in which there are multiple paths between a source and a destination. When multiple paths are available, a host can use the traffic-management field to select a different path in the network.

Similarly, a host can also use the traffic-management field to reroute traffic around congested links or nodes. Specifically, if the host receives a congestion notification packet, e.g., an ECN packet, it can use the traffic-management field to route around the congestion. Alternatively, the host may detect congestion by monitoring packet delay, and if packet delay increases beyond a threshold, it can use the traffic-management field to try to reroute traffic around the congestion.

Suppose that, in FIG. 4, packets from source host 102 are being routed via path 402 to destination host 118. Assume that source host 102 is setting the traffic-management field to "0." Now, suppose that the link between router 104 and 106 fails. Once host 102 detects the failure (e.g., due to an expired timer), it can set the traffic-management field to "1," which may cause router 104 to forward subsequent packets via path 404. Note that if router 112 had failed instead, setting the traffic-management field to "1" would not have solved the problem. Once host 102 realizes that, it can try setting the traffic-management field to "2," which may cause router 104 to forward packets via path 406, thereby successfully rerouting the traffic around the failed router.

Similarly, if host 102 detects congestion (e.g., by receiving a congestion notification packet), it can try setting the traffic-management field to a different value to try to route around the congested link. For example, in the above example, suppose the link between router 112 and 116 is congested. If host 102 receives a congestion notification from router 112, host 102 may try setting the traffic-management field to "1" which may cause router 112 to send another congestion notification to host 102 because both paths 402 and 404 pass through the link between router 112 and 116. Once host 102 receives the second congestion notification, host 102 may set the traffic-management field to "2," which may cause router 404 to route traffic via path 406, thereby successfully rerouting traffic around the congested link.

Note that if a retransmission timeout turns out to be spurious, and the host ends up changing the traffic-management field for no good reason, it doesn't cause any harm. The traffic will simply be rerouted via another valid path. There is no need to prove the "correctness" of these host-based traffic management techniques, because no harm is done if the host incorrectly detects a network failure or a congestion event. This is an important property because proving correctness of routing protocols is usually important, and can often be quite difficult.

If the host is coupled with two different routers using two separate links, the host may send packets over one of the links if it perceives that the other link is congested. In this approach, we may not have to change the behavior of the core routers; the host can simply send packet packets via a different outgoing link which can cause the packets to traverse a different route through the network.

Note that changing the value of the traffic-management field can cause reordering of packets. If two packets in a packet flow have different values in their traffic-management fields, they may be routed via different paths, which may cause them to reach the destination in the wrong order. Hence, the destination host's software may need some minor modifications so that it can better handle out-of-order packets.

For example, TCP may need minor modifications so that it can better tolerate out-of-order packets. In one embodiment, the TCP stack can be modified so that it waits for a short time, e.g., one or more milliseconds, before sending a duplicate acknowledgement. If the receiver's TCP stack doesn't wait for a short period to ensure that there aren't any out-of-order packets, it may mistakenly cause the sender to believe that a packet was lost. Note that if the packet was really lost, this extra delay can increase the amount of time it takes the sender to realize that the packet was lost. However, if the number of packets that are actually lost is small compared to the number of packets that are reordered, the impact of this extra delay will most likely be imperceptible. The network stack may also need to be modified so that it can keep track of out-of-order packets in an efficient manner. For example, TCP may need to be modified so that it uses a hash table or a tree data-structure to store segments.

The traffic-management field can also be used to select the type of multipath routing on a per-application and/or a per-protocol basis. For example, a file transfer application may want to use per-packet multipath routing to maximize throughput, whereas a video streaming application may want to use per-flow multipath routing to avoid reordering of packets. The embodiment may use per-packet multipath routing for protocols that are not sensitive to packet reordering, e.g., UDP (User Datagram Protocol) or SCTP (Stream Control Transmission Protocol). On the other hand, the embodiment may use per-flow multipath routing for protocols that are sensitive to packet reordering, e.g., TCP.

Since the traffic-management field can be set by the application, it enables the application to select which type of multipath routing to use. Specifically, if the host wants to increase throughput by concurrently sending traffic over multiple routes in the network, the host can use as many different traffic management field values possible. For example, if a file transfer application wants to concurrently use paths 402, 404, and 406, it can set different values for the traffic-management field in successive packets, thereby causing packets to be concurrently routed via different paths.

The network nodes can monitor the traffic-management field. The network nodes can then convey the health of the network to other nodes in the network. This process can be used to help the network converge faster.

Process for Influencing How a Packet is Routed Through a Network

Figure 5:
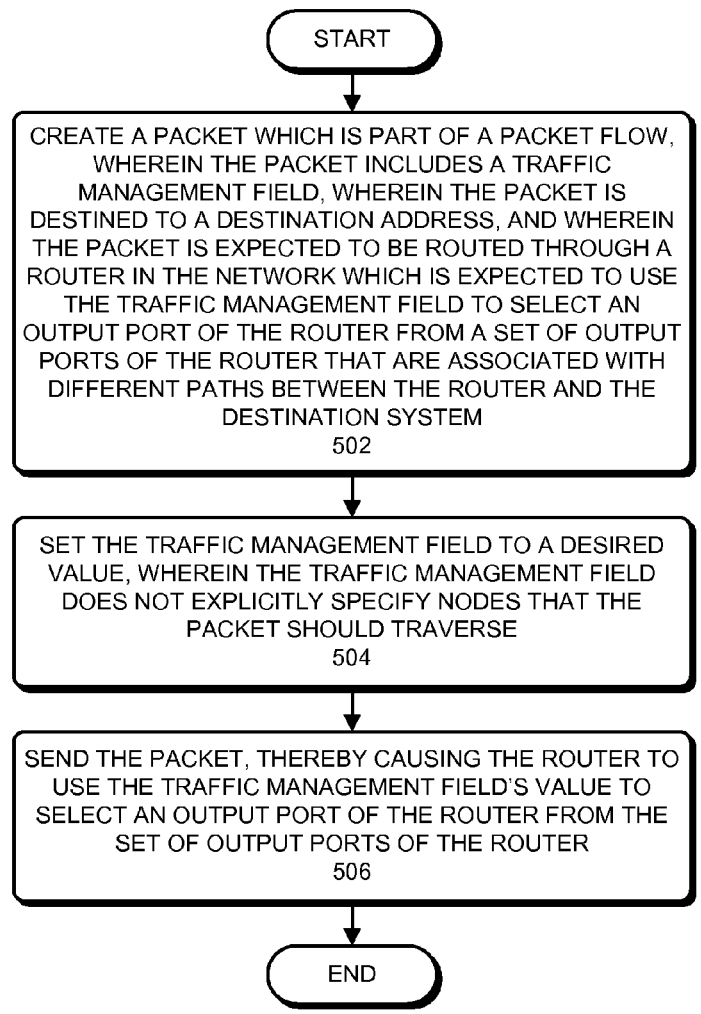
FIG. 5 presents a flowchart that illustrates a process for influencing how a packet is routed through a network without explicitly specifying which nodes the packet should traverse in accordance with an embodiment of the present invention.

FIG. 5 presents a flowchart that illustrates a process for influencing how a packet is routed through a network without explicitly specifying which nodes the packet should traverse in accordance with an embodiment of the present invention.

An application on a source system may send packets to a destination system. The source system may create a packet which is part of a packet flow, wherein the packet includes a traffic-management field, wherein the packet is destined to a destination system, and wherein the packet is expected to be routed through a router in the network which is expected to use the traffic-management field to select an output port of the router from a set of output ports of the router that are associated with different paths between the router and the destination system (step 502).

Next, the source system can set the traffic-management field to a desired value, wherein the traffic-management field does not explicitly specify nodes that the packet should traverse (step 504).

The traffic-management field can simply be a value that routers use to select a path from a set of paths. Unlike conventional techniques, e.g., source routing, the traffic-management field does not specify the nodes that the packet should traverse. As noted above, convention techniques have a number of drawbacks. In contrast to conventional techniques, the traffic-management field based technique can be implemented by making minor modifications to current router hardware, and it does not suffer from scaling problems.

Continuing with the flowchart shown in FIG. 5, the source system can then send the packet to the destination system, thereby causing the router to use the traffic-management field's value to select an output port of the router from the set of output ports of the router (step 506).

Next, the application may provide another packet in the same packet flow to the source system. The source system may set the packet's traffic-management field to a different value. Next, the source system may send the packet, thereby causing the router to select a different output port, which causes the packet to be routed over a different path.

Process for Forwarding Packets

Figure 6:
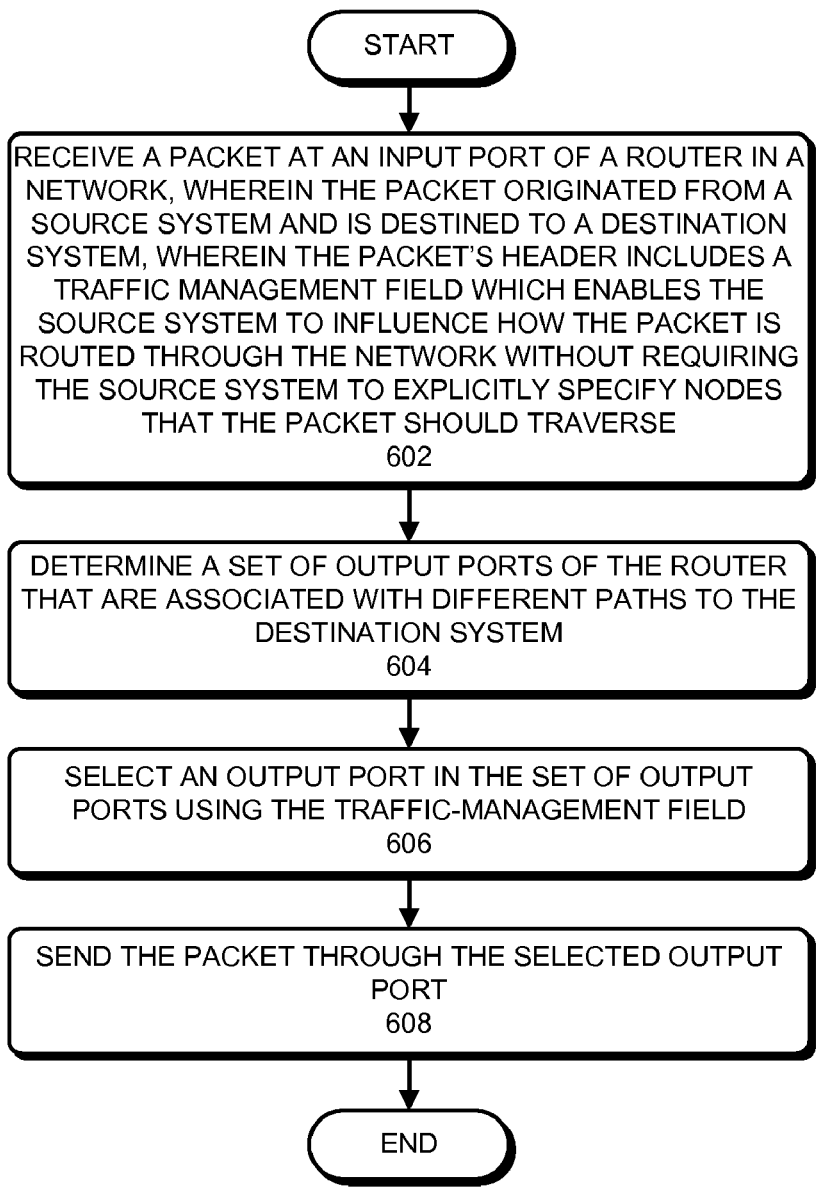
FIG. 6 presents a flowchart that illustrates a process for forwarding packets in accordance with an embodiment of the present invention.

FIG. 6 presents a flowchart that illustrates a process for forwarding packets in accordance with an embodiment of the present invention.

A router in a network may receive a packet at an input port, wherein the packet originated from a source system and is destined to a destination system, and wherein the packet includes a traffic-management field which enables the source system to influence how the packet is routed through the network without requiring the source system to explicitly specify nodes that the packet should traverse (step 602).

Next, the router can determine a set of output ports of the router that are associated with different paths to the destination system (step 604).

The router can then select an output port in the set of output ports using the traffic-management field (step 606). The router can select the output port in the set of output ports by evaluating an expression using the traffic-management field. In addition to using the traffic-management field, the router can also use information contained in the packet's header or payload to select the output port.

Next, the router can send the packet through the selected output port (step 608).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for routing packets, comprising:
receiving a packet at an input port of a router which is part of a network, wherein the packet originated from a source system and is destined to a destination system, and wherein the packet includes a traffic-management field that contains a value that is provided by the source system, wherein the router uses the value in the traffic management field to influence how the packet is routed through the network without explicitly specifying nodes that the packet should traverse;
determining a set of output ports of the router that are associated with different paths to the destination system;
selecting an output port, from the set of output ports associated with the destination system, which involves:
computing a hash value which selects an output port based in part on a header of the packet;
adding the value from the traffic-management field in the packet to the hash value to generate an adjusted value; and
based on the adjusted value, selecting a path in the network for routing the packet as influenced by the source system; and
sending the packet through the selected output port.

2. The method of claim 1,
wherein the traffic-management field uses one or more bits in the header of the packet; and
wherein determining the set of output ports includes performing a route-lookup using information contained in the header of the packet.

3. The method of claim 2,
wherein selecting the output port comprises evaluating an expression: $((f(src\_ip, dst\_ip, L4\_prot, L4\_src\_port, L4\_dst\_port) + TrafficMgmt) \bmod NumberOfNextHops)$,
where f is a hash function, src_ip is a source address of the packet, dst_ip is a destination address of the packet, L4_prot is a value of a protocol field in the header of the packet which is associated with a transport layer protocol, L4_src_port is a source port number of the packet, L4_dst_port is a destination port number of the packet, TrafficMgmt is the traffic-management field, NumberOfNextHops is the number of output ports in the set of output ports, and "mod" is a modulo operation.

4. The method of claim 1, wherein the packet is one of:
an IPv4 (Internet Protocol Version 4) packet; or
an IPv6 (Internet Protocol Version 6) packet.

5. The method of claim 1, wherein the traffic-management field is used to:
reroute traffic around a congested link;
reroute traffic around a failed link;
reroute traffic around a failed node; or
increase throughput by concurrently sending traffic through multiple routes.

6. A non-transitory computer-readable storage medium storing instructions that when executed by a router cause the router to perform a method for routing packets, comprising:
receiving a packet at an input port of the router which is part of a network, wherein the packet originated from a source system and is destined to a destination system, and wherein the packet includes a traffic-management field that contains a value that is provided by the source system, wherein the router uses the value in the traffic management field to influence how the packet is routed through the network without explicitly specifying nodes that the packet should traverse;

determining a set of output ports of the router that are associated with different paths to the destination system;
selecting an output port, from the set of output ports associated with the destination system, which involves:
  computing a hash value which selects an output port based in part on a header of the packet;
  adding the value from the traffic-management field in the packet to the hash value to generate an adjusted value; and
  based on the adjusted value, selecting a path in the network for routing the packet as influenced by the source system; and
sending the packet through the selected output port.

7. The computer-readable storage medium of claim 6,
wherein the traffic-management field uses one or more bits in the header of the packet; and
wherein determining the set of output ports includes performing a route-lookup using information contained in the header of the packet.

8. The computer-readable storage medium of claim 7,
wherein selecting the output port comprises evaluating an expression: ((f(src_ip, dst_ip, L4_prot, L4_src_port, L4_dst_port)+TrafficMgmt) mod NumberOfNextHops),
where f is a hash function, src_ip is a source address of the packet, dst_ip is a destination address of the packet, L4_prot is a value of a protocol field in the header of the packet which is associated with a transport layer protocol, L4_src_port is a source port number of the packet, L4_dst_port is a destination port number of the packet, TrafficMgmt is the traffic-management field, NumberOfNextHops is the number of output ports in the set of output ports, and "mod" is a modulo operation.

9. The computer-readable storage medium of claim 6, wherein the packet is one of:
an IPv4 (Internet Protocol Version 4) packet; or
an IPv6 (Internet Protocol Version 6) packet.

10. The computer-readable storage medium of claim 6, wherein the traffic-management field is used to:
reroute traffic around a congested link;
reroute traffic around a failed link;
reroute traffic around a failed node; or
increase throughput by concurrently sending traffic through multiple routes.

11. A router, comprising:
a receiving-mechanism configured to receive a packet at an input port of the router which is part of a network, wherein the packet originated from a source system and is destined to a destination system, and wherein the packet includes a traffic-management field that contains a value that is provided by the source system, wherein the router uses the value in the traffic management field to influence how the packet is routed through the network without explicitly specifying nodes that the packet should traverse;
a determining-mechanism configured to determine a set of output ports of the router that are associated with different paths to the destination system;
a selecting-mechanism configured to select an output port, from the set of output ports, by:
  computing a hash value which selects an output port based in part on a header of the packet;
  adding the value from the traffic-management field in the packet to the hash value to generate an adjusted value; and
  based on the adjusted value, selecting a path in the network for routing the packet as influenced by the source system; and
a sending-mechanism configured to send the packet through the output port.

12. The router of claim 11,
wherein the traffic-management field uses one or more bits in the header of the packet; and
wherein determining the set of output ports includes performing a route-lookup using information contained in the header of the packet.

13. The router of claim 12,
wherein selecting the output port comprises evaluating an expression: ((f(src_ip, dst_ip, L4_prot, L4_src_port, L4_dst_port)+TrafficMgmt) mod NumberOfNextHops),
where f is a hash function, src_ip is a source address of the packet, dst_ip is a destination address of the packet, L4_prot is a value of a protocol field in the header of the packet which is associated with a transport layer protocol, L4_src_port is a source port number of the packet, L4_dst_port is a destination port number of the packet, TrafficMgmt is the traffic-management field, NumberOfNextHops is the number of output ports in the set of output ports, and "mod" is a modulo operation.

14. The method of claim 11, wherein the packet is one of:
an IPv4 (Internet Protocol Version 4) packet; or
an IPv6 (Internet Protocol Version 6) packet.

15. The router of claim 11, wherein the traffic-management field is used to:
reroute traffic around a congested link;
reroute traffic around a failed link;
reroute traffic around a failed node; or
increase throughput by concurrently sending traffic through multiple routes.

16. A method for influencing how a packet is routed through a network without explicitly specifying which nodes the packet should traverse, the method comprising:
creating a first packet at a source system, wherein the first packet is part of a packet flow, wherein the first packet includes a first traffic-management field, wherein the first packet is destined to a destination system, and wherein the first packet is expected to be routed through a router in the network which is expected to first traffic-management field to select an output port of the router from a set of output ports of the router that are associated with different paths between the router and the destination system;
setting the first traffic-management field to a first value, wherein the traffic-management field provided by the source system influences how the packet is routed at the router, and wherein the first traffic-management field does not explicitly specify which nodes the first packet should traverse; and
sending the first packet to the destination system, thereby causing the router to select a first output port of the router from the set of output ports of the router by adding the first value to a hash value to generate an adjusted value that is used to select an output port.

17. The method of claim 16,
wherein the first traffic-management field uses one or more bits in a header of the packet; and
wherein the router is expected to determine the set of output ports by performing a route-lookup using information contained in the header of the packet.

18. The method of claim 17,
wherein adding the first value to the hash value comprises evaluating an expression: ((f(src_ip, dst_ip, L4_prot, L4_src_port, L4_dst_port)+TrafficMgmt) mod NumberOfNextHops),
where f is a hash function, src_ip is a source address of the packet, dst_ip is a destination address of the packet, L4_prot is a value of a protocol field in the header of the packet which is associated with a transport layer protocol, L4_src_port is a source port number of the packet, L4_dst_port is a destination port number of the packet, TrafficMgmt is the traffic-management field, NumberOfNextHops is the number of output ports in the set of output ports, and "mod" is a modulo operation.

19. The method of claim 16, wherein the packet is one of:
an IPv4 (Internet Protocol Version 4) packet; or
an IPv6 (Internet Protocol Version 6) packet.

20. The method of claim 16, wherein the traffic-management field is used to:
reroute traffic around a congested link;
reroute traffic around a failed link;
reroute traffic around a failed node; or
increase throughput by concurrently sending traffic through multiple routes.

21. The method of claim 16, the method further comprising:
creating a second packet at the source system, wherein the second packet is part of the packet flow, wherein the second packet includes a second traffic-management field, and wherein the second packet is expected to be routed through the router;
setting the second traffic-management field to a second value, wherein the second value is different from the first value, and wherein the second traffic-management field does not explicitly specify which nodes the second packet should traverse; and
sending the second packet to the destination system, thereby causing the router to use the second value to select a second output port of the router from the set of output ports, wherein the second output port is different from the first output port.

22. A non-transitory computer-readable storage medium storing instructions that when executed by a source system cause the source system to perform a method for influencing how a packet is routed through a network without explicitly specifying which nodes the packet should traverse, the method comprising:
creating a first packet at the source system, wherein the first packet is part of a packet flow, wherein the first packet includes a first traffic-management field, wherein the first packet is destined to a destination system, and wherein the first packet is expected to be routed through a router in the network which is expected to use the first traffic-management field to select an output port of the router from a set of output ports of the router that are associated with different paths between the router and the destination system;
setting the first traffic-management field to a first value, wherein the traffic-management field provided by the source system influences how the packet is routed at the router, and wherein the first traffic-management field does not explicitly specify which nodes the first packet should traverse; and
sending the first packet to the destination system, thereby causing the router to select a first output port of the router from the set of output ports of the router by adding the first value to a hash value to generate an adjusted value that is used to select an output port.

23. The computer-readable storage medium of claim 22,
wherein the first traffic-management field uses one or more bits in a header of the packet;
wherein the router is expected to determine the set of output ports by performing a route-lookup using information contained in the header of the packet; and
wherein adding the first value to the hash value comprises evaluating an expression: ((f(src_ip, dst_ip, L4_prot, L4_src_port, L4_dst_port)+TrafficMgmt) mod NumberOfNextHops),
where f is a hash function, src_ip is a source address of the packet, dst_ip is a destination address of the packet, L4_prot is a value of a protocol field in the header of the packet which is associated with a transport layer protocol, L4_src_port is a source port number of the packet, L4_dst_port is a destination port number of the packet, TrafficMgmt is the traffic-management field, NumberOfNextHops is the number of output ports in the set of output ports, and "mod" is a modulo operation.

24. The computer-readable storage medium of claim 22,
wherein the packet is one of:
an IPv4 (Internet Protocol Version 4) packet; or
an IPv6 (Internet Protocol Version 6) packet; and
wherein the traffic-management field is used to:
reroute traffic around a congested link;
reroute traffic around a failed link;
reroute traffic around a failed node; or
increase throughput by concurrently sending traffic through multiple routes.

25. The computer-readable storage medium of claim 22, the method further comprising:
creating a second packet at the source system, wherein the second packet is part of the packet flow, wherein the second packet includes a second traffic-management field, and wherein the second packet is expected to be routed through the router;
setting the second traffic-management field to a second value, wherein the second value is different from the first value, and wherein the second traffic-management field does not explicitly specify which nodes the second packet should traverse; and
sending the second packet to the destination system, thereby causing the router to use the second value to select a second output port of the router from the set of output ports, wherein the second output port is different from the first output port.

* * * * *

UNITED STATES PATENT AND TRADEMARK OFFICE
CERTIFICATE OF CORRECTION

| | | |
|---|---|---|
| PATENT NO. | : 8,111,649 B1 | Page 1 of 1 |
| APPLICATION NO. | : 12/059186 | |
| DATED | : February 7, 2012 | |
| INVENTOR(S) | : Amit Agarwal, Ross Koningstein and Hsiao-Keng J. Chu | |

It is certified that error appears in the above-identified patent and that said Letters Patent is hereby corrected as shown below:

TITLE PAGE

Item (12) replace "Agarwall" with -- Agarwal --

Item (75) Inventors "Amit Agarwall" should read -- Amit Agarwal --

Signed and Sealed this
Fifteenth Day of May, 2012

David J. Kappos
*Director of the United States Patent and Trademark Office*